United States Patent
Yasui et al.

(10) Patent No.: US 6,680,741 B1
(45) Date of Patent: Jan. 20, 2004

(54) IMAGE PROCESSOR AND IMAGE PROCESSING METHOD

(75) Inventors: Keisuke Yasui, Tokyo (JP); Seisuke Morioka, Tokyo (JP); Jun Okubo, Fujisawa (JP)

(73) Assignee: Sega Enterprises, Ltd., Tokyo (JP)

( * ) Notice: Subject to any disclaimer, the term of this patent is extended or adjusted under 35 U.S.C. 154(b) by 0 days.

(21) Appl. No.: 09/424,424

(22) PCT Filed: May 22, 1998

(86) PCT No.: PCT/JP98/02262

§ 371 (c)(1),
(2), (4) Date: Jul. 26, 2000

(87) PCT Pub. No.: WO98/53425

PCT Pub. Date: Nov. 26, 1998

(30) Foreign Application Priority Data

May 22, 1997 (JP) .............................................. 9-131831

(51) Int. Cl.$^7$ ................................................ G06T 11/60
(52) U.S. Cl. ....................................................... 345/619
(58) Field of Search ................................ 345/418, 419, 345/420, 441, 587, 608, 619

(56) References Cited

U.S. PATENT DOCUMENTS 4,885,703 A  12/1989  Deering

OTHER PUBLICATIONS

Jan Weingarten, teach youself WordPerfect 6.1, 1995, MIS Press, p. 262–270, 277–279.*

* cited by examiner

Primary Examiner—Matthew C. Bella
Assistant Examiner—G. F. Cunningham
(74) Attorney, Agent, or Firm—Keating & Bennett, LLP

(57) ABSTRACT

A computer graphic system wherein image element data can be processed efficiently at a high speed, and images of higher quality are produced at a lower cost than conventional. An image processor for dividing a screen into regions (fragments) of predetermined sizes and processing data on every divided region (fragment), wherein pieces of information on image constituting elements are rearranged in a direction vertical to a scanning line (ST1), the pieces of information on the image constituting elements are rearranged in a direction parallel to the scanning line (ST2), and image processing for opaque polygons, polygons with transparent pixels, and semitransparent polygons is performed in the order of mention on the basis of the rearranged pieces of information (ST3 to ST6).

9 Claims, 14 Drawing Sheets

FIG. 13
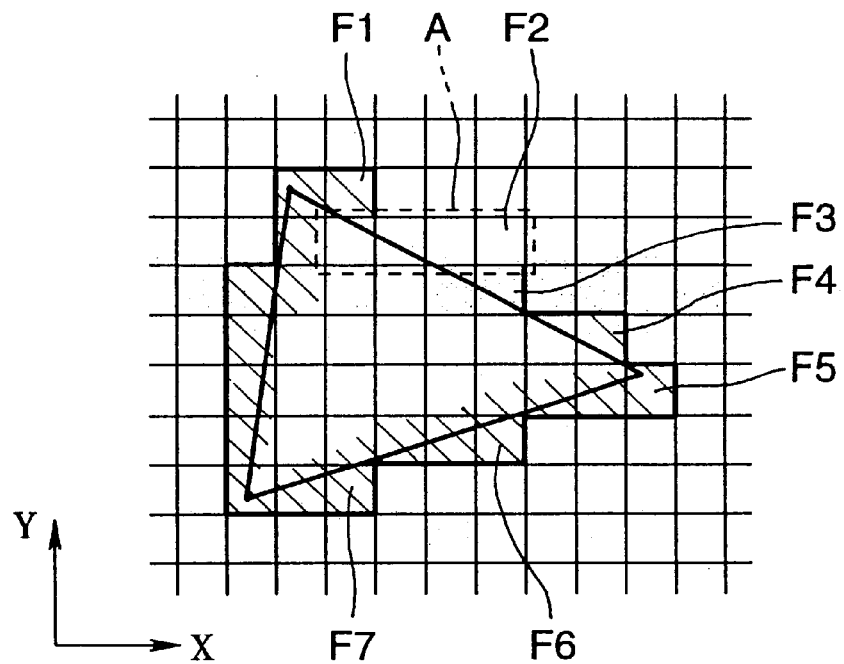
(a)
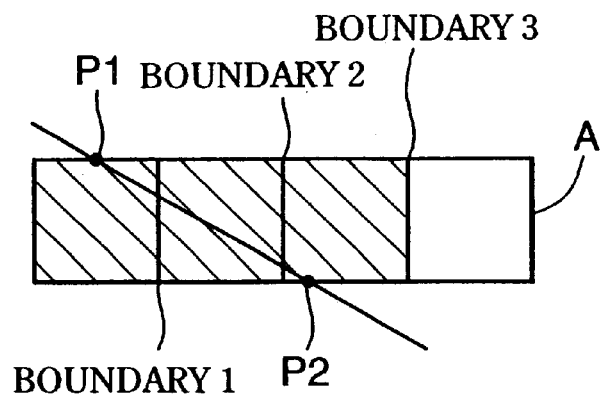
(b)

IMAGE PROCESSOR AND IMAGE PROCESSING METHOD

TECHNICAL FIELD

The present invention relates to a n image processor and an image processing method for computer graphics.

BACKGROUND ART

In the field of computer graphics, to realize a higher capability of image processing, there has been known a method of processing by which a screen is divided into tiny rectangular regions (hereinafter referred to as "fragments") and processing is done fragment by fragment.

This conventional method will now be described with reference to FIGS. 14 to 17, wherein, at first, (1): each polygon is divided by frames of fragments and memorized with the fragments containing the polygons known.

In FIG. 14, there are fifteen fragments arranged in a matrix of 3×5, on which polygons A, R and C are defined. Concerning the polygon A, it corresponds to eight fragments, as shown in FIG. 15. These fragments are stored in a buffer memory shown in FIG. 16 according to their coordinates α, β, γ, etc. α1 and α2 in FIG. 15 are stored in the memory area α of the buffer memory, β1 and β2 in FIG. 15 are stored in the memory area β of the buffer memory, and γ1 and γ2 in FIG. 15 are stored in the memory area γ of the buffer memory. The same is applied to the remaining coordinates.

(2): Next, of all the fragments, fragments covered by a polygon currently concerned are computed and painted. For example, as shown in FIG. 17, a fragment δ1 is first painted toward the polygon A (see FIG. 17(*b*)), painted toward the polygon B (see FIG. 17(*c*)), and finally painted toward the polygon C (see FIG. 17(*d*)). Such operation is repeated until the final polygon is processed or the fragment is totally covered. And the forgoing processing is performed for all the fragments.

The conventional data processing of image elements has been performed on the foregoing procedures (1) and (2).

However, such method requires all the polygons to be divided every objective fragment, resulting in that a huge amount of calculation is necessary and a long processing time is also required.

Additionally, there arise various drawbacks. For example, a storage of a greater capacity should be arranged to memorize information about polygons which have been divided to be produced. In order to gain faster processing, the storage should be faster in operation, raising cost for the storage.

Moreover, in cases semitransparent polygons possess texture data, they can be processed on the conventional method.

The present invention has been done for resolving the foregoing problems, and an object of the present invention is to enable processing of data of image elements to be performed efficiently and fast in computer graphic systems and to obtain higher-quality images at a lower cost than conventional. One method to realize such object is that a screen is divided into tiny regions (fragments) for processing. In this case, an object is to efficiently retrieve polygons included in regions concerned. To be brief, in computer graphic systems, there are provided a system and a method that provide images of higher quality at a lower cost than the conventional systems.

SUMMARY OF THE INVENTION

An image processor according to the present invention is an image processor, in which a screen is divided into regions of a predetermined size and processing is performed every divided region, comprising first rearranging means for rearranging pieces of information on image constituting elements in a direction vertical to a scanning line, second rearranging means for rearranging the pieces of information on the image constituting elements in a horizontal direction to the scanning direction, and an image processing unit performing image processing on the basis of the rearranged pieces of information on the image constituting elements.

In the image processor of the present invention, the first rearranging means perform the rearrangement based on minimum or maximum values of the image constituting elements concerning the vertical direction and the second rearranging means perform the rearrangement based on minimum or maximum values of the image constituting elements concerning the horizontal direction, among vertical coordinates of a region to be processed by the first rearranging means.

It may be accepted that the rearrangement is performed either by minimums or maximums. Even when keys by which the rearrangement is performed are maximums, it is enough that only the directions in the order of processing are changed ("left to right sides" to "right to left sides" or "upper to lower sides" to "lower to upper sides"), that is, the similar processing being able to be employed. Even if the order is either vertical to horizontal sides or horizontal to vertical sides, the similar processing can be used.

In the image processor of the present invention, the first and second rearranging means perform link processing which mutually links the rearranged pieces of information on the image constituting elements.

In the image processor according to the present invention, the first and second rearranging means perform link update processing which invalidates ones unnecessary within the regions corresponding to the image constituting elements.

In the image processor of the present invention, the image processing unit not only sections, as to image processing for each divided region, objectives to be processed into opaque polygons, polygons with transparent pixels, and semitransparent polygons but also processes in the order of the opaque polygons, polygons with transparent pixels, and semitransparent polygons.

The image processing method according to the present invention provides a method, which allows a screen to be divided into regions of a predetermined size and processing to be done every divided region, has a first rearranging step of rearranging pieces of information on image constituting elements in a vertical direction to a scanning line, a second rearranging step of rearranging the pieces of information on the image constituting elements in a horizontal direction to the scanning line, and an image processing step of performing image processing on the basis of the rearranged pieces of information of the image constituting elements.

According to the image processing method of the present invention, in the first rearranging step, its rearrangement is performed on a minimum value of the image constituting elements with regard to the vertical direction, and in the second rearranging step, its rearrangement is performed on a minimum value of the image constituting elements with regard to the horizontal direction, among vertical coordinates of a region to be processed in the first rearranging step.

According to the image processing method of the present invention, in the first and second rearranging steps, link processing is performed to mutually link the rearranged pieces of information on the image constituting elements.

According to the image processing method of the present invention, in the first and second rearranging steps, link update processing is performed to invalidate unnecessary ones among the regions corresponding to the image constituting elements.

According to the image processing method of the present invention, in the image processing step, the image processing for each divided region is performed with objectives to be processed sectioned into opaque polygons, polygons with transparent pixels, and semitransparent polygons, and performed in the order of the opaque polygons, polygons with transparent pixels, and semitransparent polygons.

BRIEF DESCRIPTION OF THE DRAWINGS

FIG. 13 is an illustration for link update processing in the first embodiment 1 of the present invention.

BEST MODE FOR CARRYING OUT THE INVENTION

Embodiment 1 of the Invention

An apparatus and method of an embodiment 1 according to the present invention will now be detailed.

Figure 1:
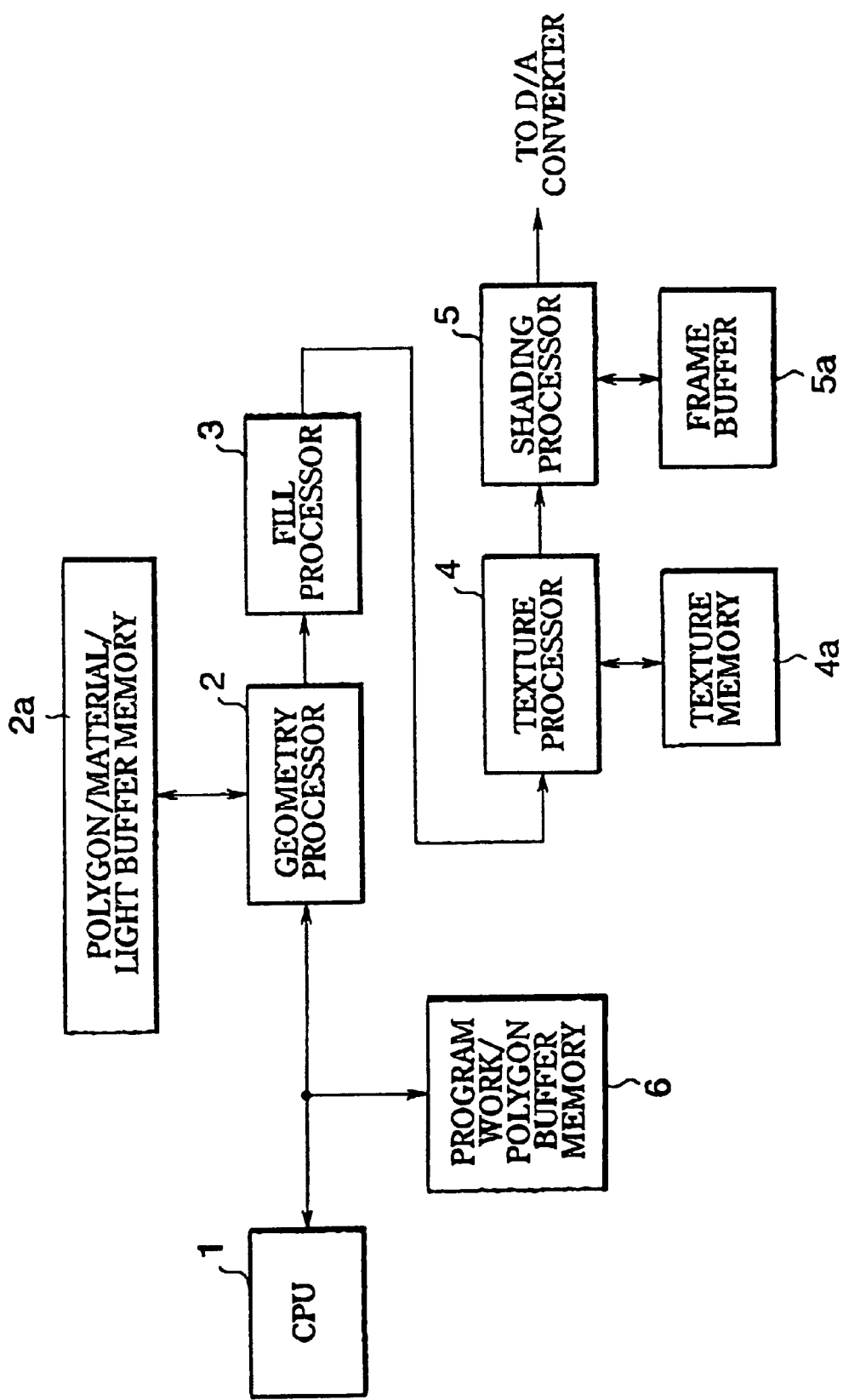
FIG. 1 is a block diagram functionally outlining an image processor according to an embodiment 1 of the present invention.

FIG. 1 is an outlined functional block diagram of according to the embodiment 1 of the present invention. In the figure, a reference 1 is a CPU (central processing unit), which is used to operate for objects in a virtual space, to obtain information on its operation, and to perform a variety of controls. A reference 2 shows a geometry processor that performs at a higher speed geometric conversion (i.e. calculation in vector quantities), such as coordinate conversion of polygons, clipping, perspective conversion in the three-dimensional computer graphics and/or intensity calculation. A reference 2a is a polygon/material/light buffer memory (polygon/material/light buffer RAM), which is used to memorize valid polygon data, material data, and light data for one frame by the geometry processor 2 under operation. The polygons are polyhedrons constituting solids in the virtual space. The contents of data stored into the buffer memory 2a are as follows:

- link information, coordinate information, and other attribute information about polygons, which include LINK X, LINK Y, X, Y, iz, TX, Ty, Nx, Ny, Sign Nz, Alpha, Light ID, and Material ID;
- information of materials, which includes Depth enable, Depth function, Depth density, Texture enable, Fog enable, translucensy enable, texture type, texture function, offset x,y, size x,y, repeat x,y, mirror x,y, color id, Shinines, Material specular, Material emission, Polygon color, Texture mode, and blend mode; and
- information of light, which includes Light position, Light Direction, Light Type, Attenuation Cutoff, Spotexp, Light Color, and Light Ambient.

A reference 3 is a fill processor that is in charge of hidden-surface elimination processing. The fill processor 3 paints polygons existing within a region in order to acquires pixel by pixel each piece of information on a polygon that is placed in the foreground position.

A reference 4 is a texture processor. The texture processor 4 maps textures on each pixel in a region. Texture mapping is processing that, for producing images, maps textures defined differently from the shape of an abject onto the surface of the object of which shape is defined. A reference 4a is a texture memory (texture RAM), in which texture maps used in the processing of the texture processor 4 are preserved.

A reference 5 shows a shading processor. The shading is a technique that expresses shades or the like on objects composed of polygons in consideration of normal vectors of polygons, locations and colors of a light source, locations of a view point, directions of a line of sight, and others. The shading processor 5 calculates intensities of each pixel within a region. A reference 5a is a frame buffer into which image data for one screen are stored. Data are read in sequence from the frame buffer 5a, and then converted from digital data to analog signals, before supplied to such displays as a CRT, liquid crystal display, plasma display device, which are not shown in the figure.

A reference 6 represents a program work/polygon buffer memory (program work/polygon buffer RAM) memorizing commands (such as database of polygons and display lists) to a graphic processor as well as programs to the CPU 1. The buffer memory 6 also serves as a work memory for the CPU 1.

The fill processor 3, texture processor 4 and shading processor 5 are arranged for processing referred to as rendering. In each region, the rendering starts sequentially from its upper left position of the screen. Practically, the geometry enables objects to be located in the virtual space coordinate, and perspective-converts them onto a screen. By the rendering, pictures are produced on data defined on the screen coordinate. The rendering is repeated by the number of regions.

Referring to functional block diagrams shown in FIGS. 2 to 5, the image processor according to the embodiment 1 of the present invention will now be detailed.

Figure 2:
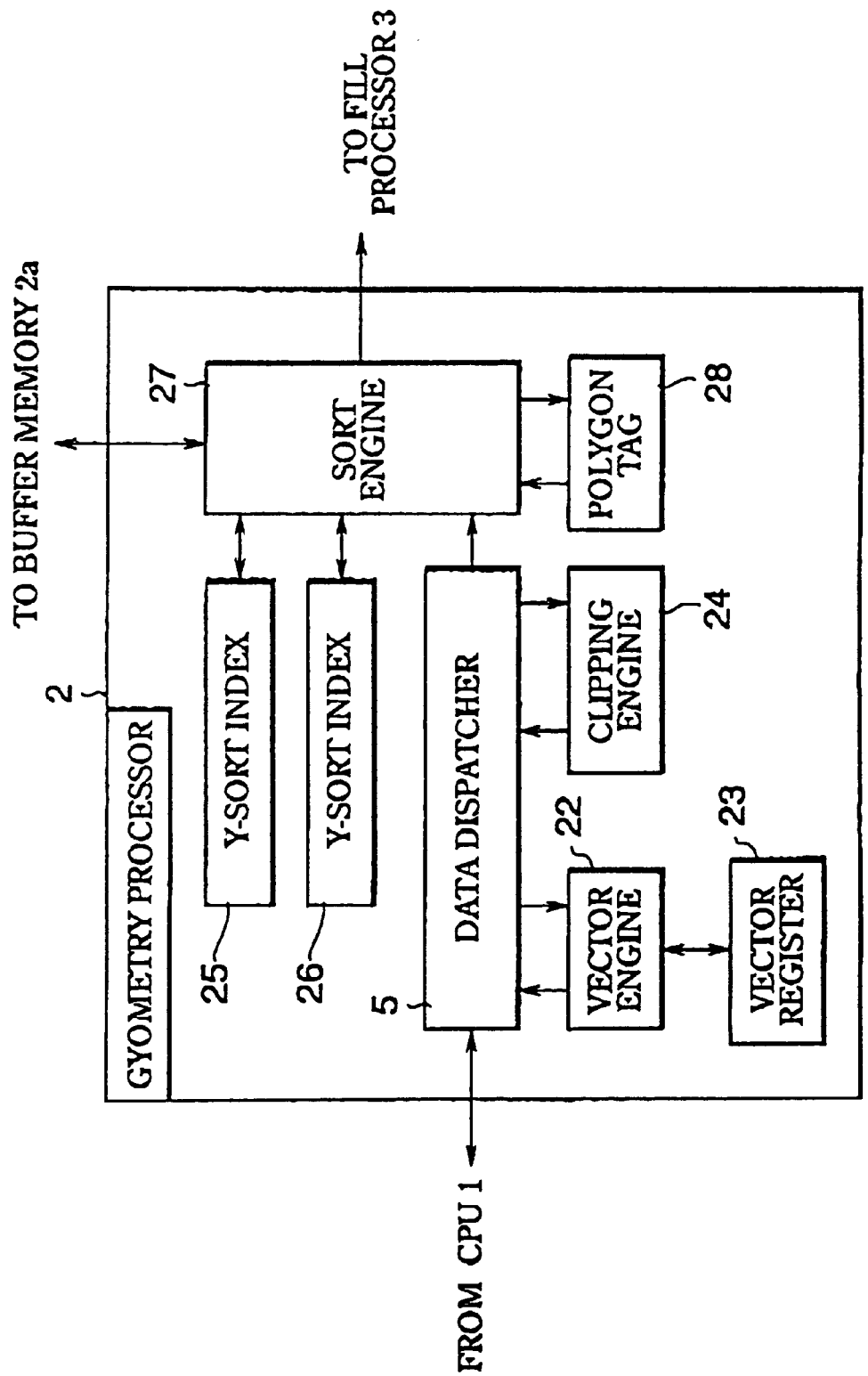
FIG. 2 is a functional block diagram of a geometry processor of the image processor according to the embodiment 1 of the present invention.

FIG. 2 is a functional block diagram of the geometry processor 2. In the figure, a reference 21 is a data dispatcher that not only reads commands from the buffer memory 6 but also analyzes them, controls a vector engine 22 and a clipping engine 24 based on the analyzed results, and provides a sort engine 27 with processed data.

A reference 22 shows a vector engine performing vector calculation. Vectors handled by the engine are stored in a vector register 23.

A reference 23 is a vector register, which preserves vector data with which the vector engine 22 calculates.

A reference 24 is a clipping engine for clipping.

A reference 25 expresses a Y-sort index (Y-sort INDEX) preserving Y-indices used in Y-sorting executed by a sort engine 27.

A reference 26 expresses an X-sort index (X-sort INDEX) preserving X-indices used in X-sorting executed by a sort engine 27.

A reference 27 shows a sort engine that carries out X-sorting and Y-sorting, retrieving from the buffer 6 polygons falling into a fragment concerned. The retrieved polygons are not merely stored into the buffer memory 2a but also sent to the fill processor 3 for rendering. The sort engine 27 is also in charge of control of both a polygon TAG 28 and a polygon cache 34.

A reference 28 is a polygon TAG for preserving TAG of the polygon cache 34.

Figure 3:
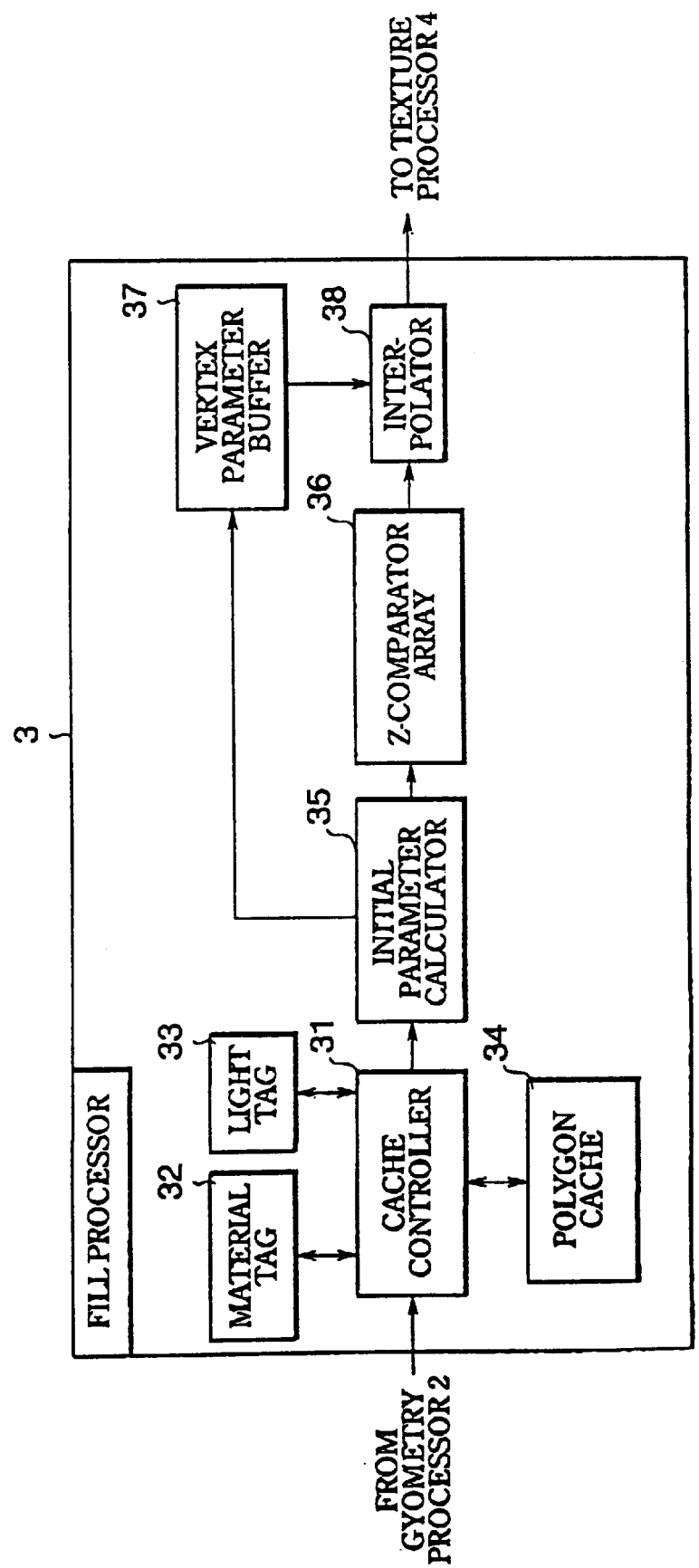
FIG. 3 is a functional block diagram of a fill processor of the image processor according to the embodiment 1 of the present invention.

FIG. 3 shows a functional block diagram of the fill processor 3. In the figure, a reference 31 is a cache controller controlling later-described material caches 42, 45, 51b, 52a and 53a and a light cache 51a.

A reference 32 is a material TAG, which preserves TAGs of later-described material caches 42, 45, 51b, 52a and 53a and a light cache 51a.

A reference 33 is a light TAG, which is a buffer preserving TAG of a light cache 51a described later.

A reference 34 represents a polygon cache, serving as a cache memory of polygon data.

A reference 35 shows an initial parameter calculator used for obtaining an initial value of DDA.

A reference 36 shows a Z-comparator array, which is responsible for the Z-comparison between polygons for hidden-surface elimination loading as well as processing polygon IDs and an interior division ratio of t0, t1 and t2. The Z-comparator array 36 is composed of 64 (8×8) pieces of Z-comparators. These comparators operate in parallel, which enables 64 pixels to be processed concurrently. One Z-comparator preserves data of a polygon. For example, these data include polygon ID, iz, t0, t1, t2, window, stencil, and shadow.

A reference 37 is a vertex parameter buffer, which preserves parameters at the vertexes of polygons. Correspondingly to the Z-comparator array 36, the buffer has a capability of memorizing data of 64 polygons.

A reference 38 is an interpolator that calculates parameters of pixels by interpolation on the basis of the results t0, t1, t2 and iz calculated by the Z-buffer array 36 and the contents of the vertex parameter buffer 37.

Figure 4:
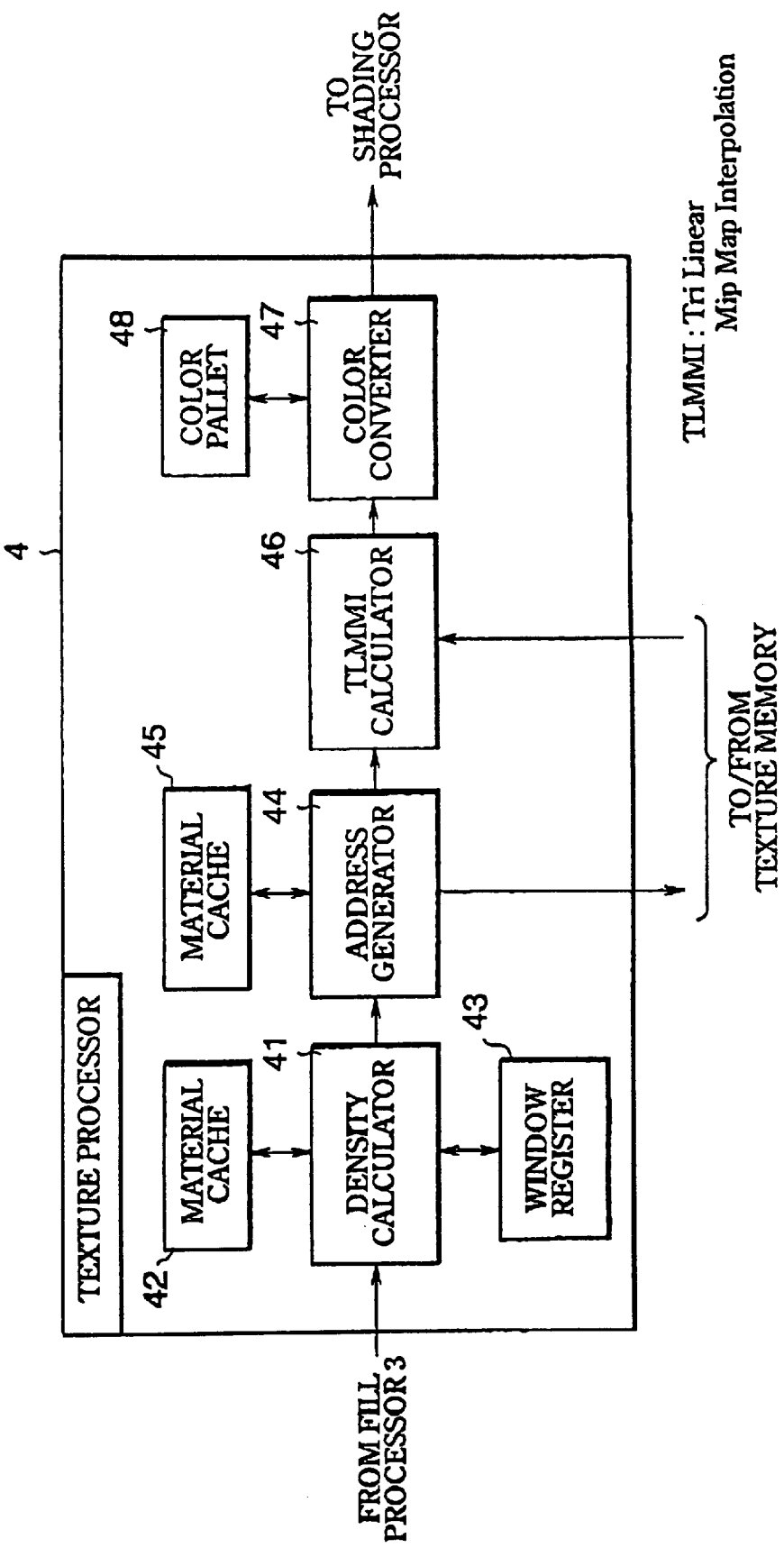
FIG. 4 is a functional block diagram of a texture processor of the image processor according to the embodiment 1 of the present invention.

FIG. 4 is a functional block diagram of the texture processor 4. In the figure, a reference 41 is a density calculator calculating a blend ratio necessary for fog and depth queuing.

A reference 42 shows a material cache where data regarding depth information are stored.

A reference 43 indicates a window register to preserve pieces of information on windows. Such information is expressed in the form of kz, cz, fog function, fog density, and fog end z, for example.

A reference 44 is an address generator calculating addresses on a texture map using texture coordinates Tx, Ty and LOD.

A reference 45 shows a material cache in which data concerning materials are preserved.

A reference 46 is a TLMMI calculator (TLMMI: Tri Linear MIP Map Interpolation) that performs "Tri Linear MIP Map interpolation" adopted as three-dimensional interpolation. The "MIP Map" is a technique eliminating anti aliasing, that is, jags of textures in mapping textures. This technique relies upon the following principle. In principle, the color (intensity) of the surface of an object projected onto one pixel should be a mean value over the colors of corresponding mapping regions thereto. If not so, jags become apparent, deteriorating extremely quality of textures. On one hand, processing to obtain each mean value leads to extremely enormous quantities of calculation load, with the result that processing takes a longer time or a fast processor is required. The MIP Map is a solution to this situation. According to MIP Map technique, to simplify collection of colors (intensities) of mapping regions in association with one pixel, a plurality of mapping data of which width is a multiple of two are prepared in advance. The sizes of all mapping regions in association with one pixel become values that exist between any two data produced by multiplying them by a multiple of two. By comparing these two data to each other, the colors of the corresponding mapping regions are obtained. For instance, if there are a one-time screen A and a ½-time screen B, each pixel of both the screens A and B corresponding to each pixel of a ⅟₁.₅-time screen C is obtained. In this example, the color of each pixel of the screen C equals a medium color between the pixels of both the screens A and B.

A reference 47 is a color converter converting colors in 4-bit texel processing.

A reference 48 shows a color pallet in which color information is preserved in 4-bit texel processing. The color pallet 48 is used to store colors for graphic drawing. On the basis of the contents of the color pallet 48, a color available to each pixel is determined.

Figure 5:
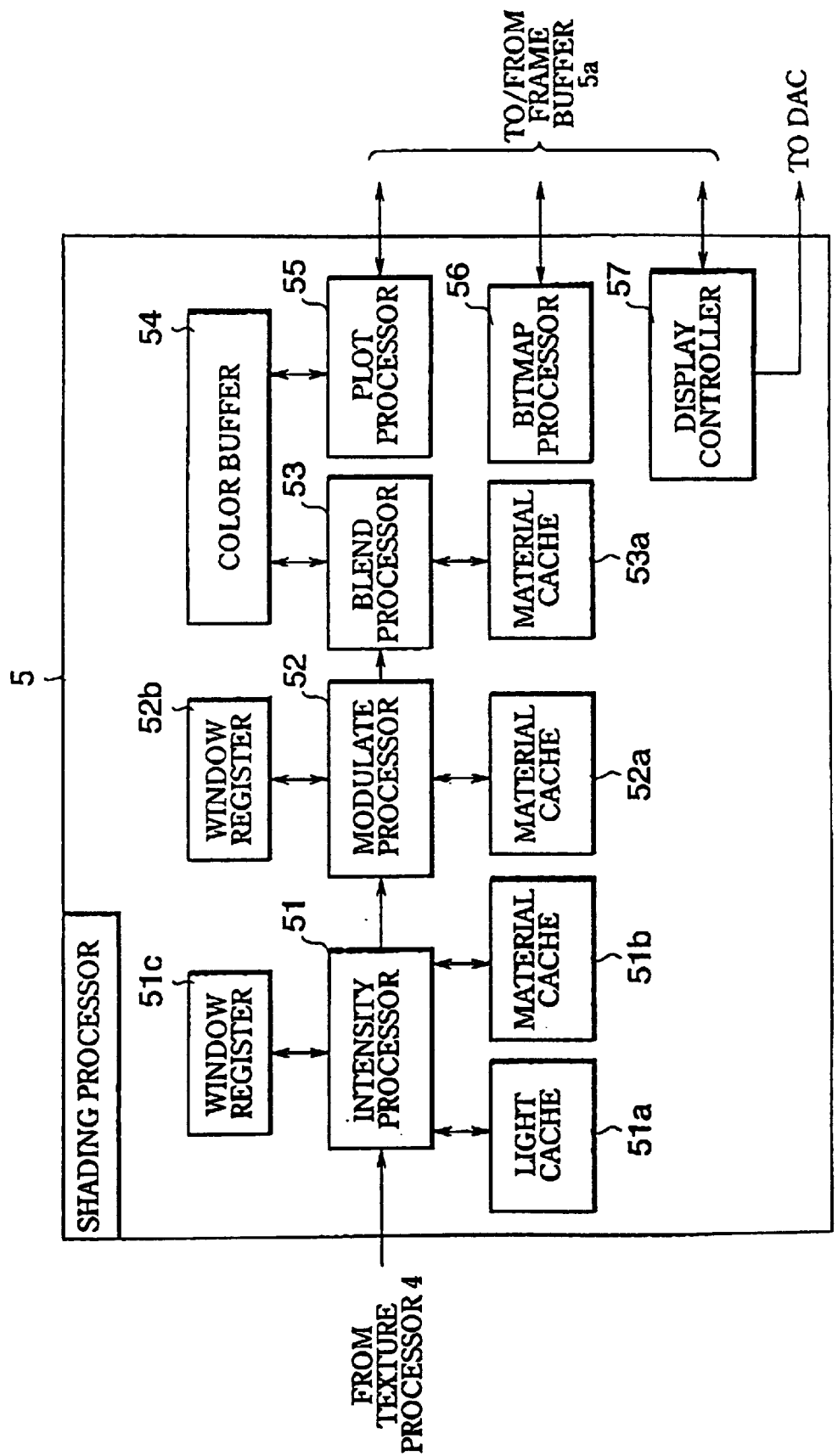
FIG. 5 is a functional block diagram of a shading processor of the image processor according to the embodiment 1 of the present invention.

FIG. 5 is a functional block diagram of the shading processor 5. In this figure, a reference 51 is an intensity processor that calculates intensities of polygons on which texture mapping have been finished.

A reference 51a is a light cache to memorize information on light.

A reference 51b shows a material cache to memorize information about materials. This information includes Shinies, Material specular, and material emission.

A reference 51c is a window register to preserve information about windows. Such information is formed from Screen center, Focus, Scene ambient, and others.

A reference 52 indicates a modulate processor that performs associating polygon colors with texture colors, intensity modulation, and fog processing.

A reference 52a is a material cache in which information on materials is stored. Such information includes Polygon color and Texture mode.

A reference 52b is a window register to preserve information on windows. This information includes Fog colors.

A reference 53 represents a blend processor that performs blending with data stored in a color buffer 54 and writes the result into the color buffer 54. The blend processor 53 blends a current pixel color and a pixel color of a frame buffer on the basis of a blend rate register, and then writes the blended result into a frame buffer of a bank represented by a write bank register.

A reference 53a is a material cache in which information regarding materials is stored. This information includes "blend mode."

A reference 54 shows a color buffer having the same size "8×8" as the fragments, which is made up of a double-bank structure.

A reference 55 is a plot processor that writes data in the color buffer 54 into the frame buffer 5a.

A reference 56 is a bitmap processor performing bitmap processing.

A reference 57 represents a display controller, which reads data in the frame buffer 5a, provides them to a DAC (Digital to Analogue Converter) in order to show them on a not-shown display.

By the way, in the embodiment 1 of the present invention, instead of dividing polygons fragment by fragment, polygons are rearranged in both the vertical direction (hereinafter referred to as the Y-direction) and the horizontal direction (hereinafter referred to as the X-direction) to a scanning line, resulting in that polygons included in each fragment can be retrieved. Using this retrieved information makes it possible to process polygons every fragment concerned currently, enabling the processing without the foregoing division of the polygons. Accordingly, processing time is shortened and it is possible to realize the processing using an apparatus of which memory device is smaller in capacity.

In rendering, the polygons are divided into types of opaque polygons, semitransparent polygons, and polygons with transparent pixels, and the semitransparent polygons are processed at the final step, which makes it possible to process the semitransparent polygons.

The entire flow of processing of the embodiment 1 according to the present invention will be described in FIG. 6.

Polygon data to be transmitted to the rendering section are rearranged by a minimum Y-coordinate value of the polygons, and written into the buffer (ST1).

Polygon data agreeing with the Y-coordinate value of a fragment concerned currently are rearranged by a minimum X-coordinate value of a concerned Y-region of polygons (ST2).

Rendering is performed toward all the opaque polygons whose coordinate agree with X- and Y-coordinates of a currently concerned fragment (ST3).

Rendering is performed toward all the transparent polygons whose coordinates agree with X- and Y-coordinates of a currently concerned fragment (ST4).

According to the data in the buffer, textures are painted, then shading is done, being converted into color data (ST5).

The steps ST4 and ST5 may be executed in the opposite order. Actually, it may be more practical to be executed in the order of steps ST5 to ST4.

Semitransparent polygons agreeing with X- and Y-coordinates of a fragment currently concerned are rendered in the order of Z-coordinate values (ST6).

Color data in the buffer are written into the frame buffer (ST7).

Figure 6:
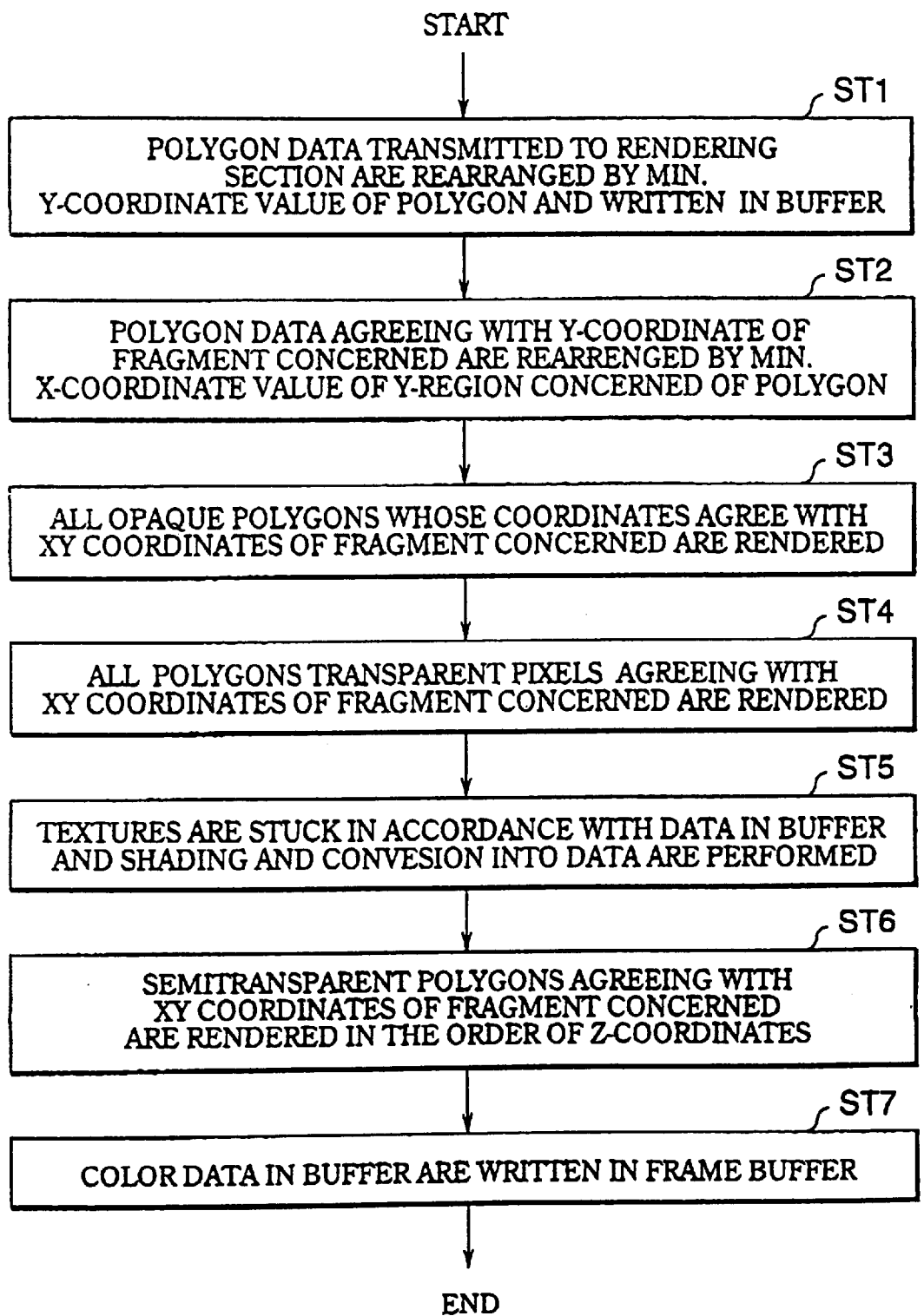
FIG. 6 is a flowchart showing the whole processing of the embodiment 1 of the present invention.

As shown in FIG. 6, polygon data are first rearranged by Y, then the rearranged data are rearranged by minimum values of X in a region Y before proceeding to processing of each line. As a result of it, the position of a fragment of a polygon, which is to be processed at first, is found.

Accordingly, it is first found that which fragment includes the polygon. In addition, after this processing concerning the first fragment included, each polygon undergoes link update processing (later described), by which polygons unnecessary for the fragments processed subsequently are removed, thus only necessary polygons being included in pieces of information on polygons included in the next fragment. Accordingly tracing back all the links that have made so far allows all the polygons falling into each fragment to be retrieved. Without dividing the polygons every fragment in order to produce new polygons and process them, information about polygons included in each fragment can be read and processed.

The link update processing is a technique that examines whether or not, after completing the processing of a polygon processing for a fragment concerned, the polygon becomes invalid in the fragments that will be subsequently concerned, and the examined polygon is removed from the link if becoming invalid.

The processing unit for rendering will be explained below.

(1): The polygons are first divided into types of opaque polygons, polygons with transparent pixels, and semitransparent polygons.

(2): The opaque polygons are then subject to processing. Overwriting, independently of texture data, realizes this processing, producing valid pixels finally remaining only the Z-comparison is then performed at a faster speed.

(3): When having completed the above processes (1) and (2), all the data in the fragment buffer become valid. At this stage, texture data are read based on the data in the fragment buffer, then their color data are converted.

(4): Polygons with transparent pixels are then rendered. To achieve this, it is necessary to determine to depict the pixels depending on whether its texel is transparent or not. In rendering, painting is therefore carried out as information on the transparent texel is read. The other procedures are identical to those for the opaque polygons. The processing order of steps (3) to (4) is preferable to its opposite processing order, because it is difficult to read information on the transparent texel in rendering.

(5): The semitransparent polygons are then processed, in which the data of all the pixels that have passed the Z-value comparison are valid. Hence, texture data are read for each pixel and painted with conversion to color data (blending). Since this blending involves the order of depicting polygons as an important matter, the Z-sorting is carried out by any appropriate means in advance.

Referring to FIGS. 7 to 13, a fragment CG system according to the embodiment 1 of the present invention will now be detailed.

Figure 7:
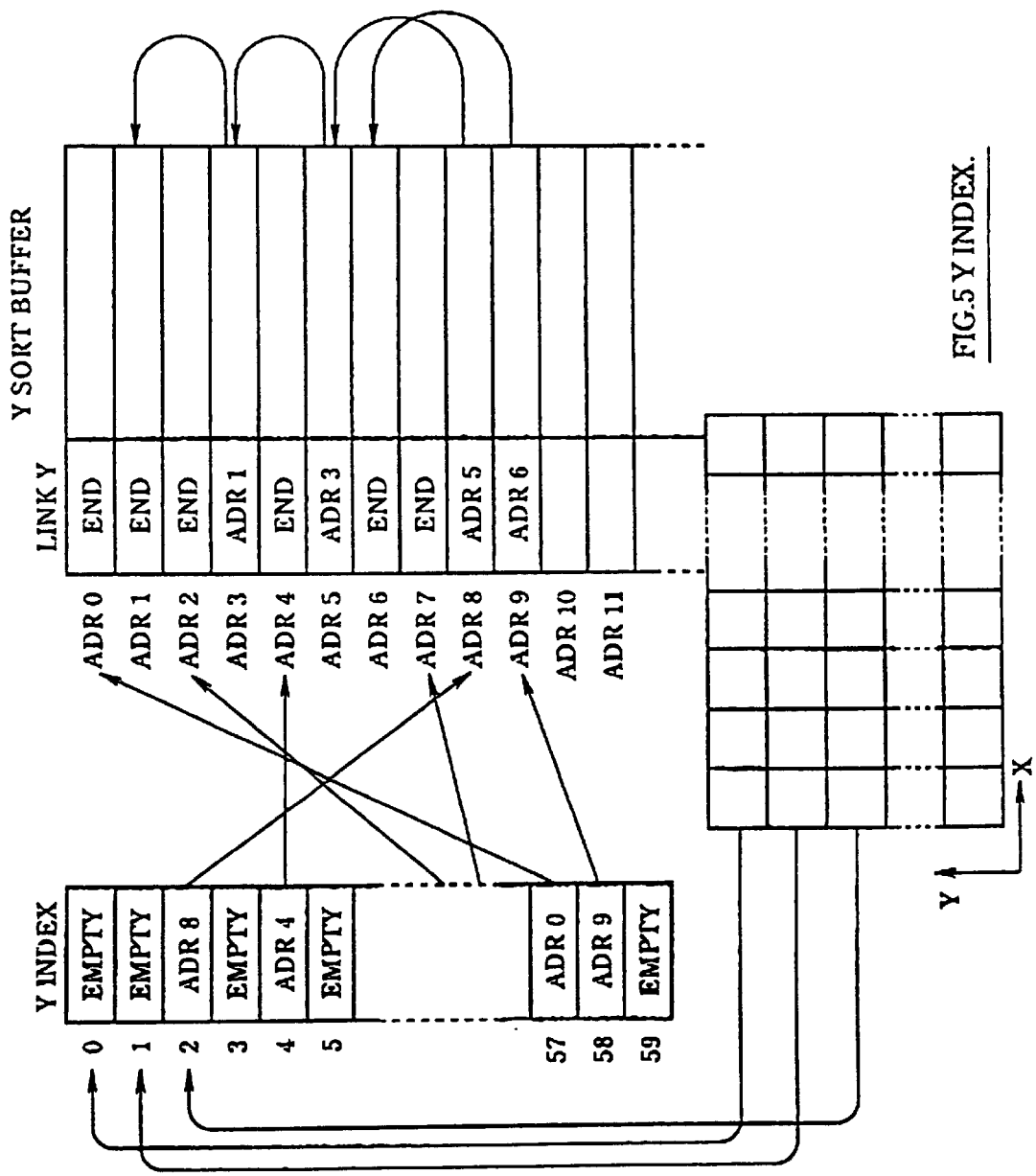
FIG. 7 is an illustration of processing as to a Y index buffer and a Y sort buffer in the first embodiment 1 of the present invention.

First the operation of rearrangement in the Y-direction will be described. FIG. 7 indicates the structures of a Y index buffer and a Y sort buffer. In the Y index buffer, stored are the top addresses of links of polygon lists having fragment lines into each of which a minimum value Ymin of Y coordinates is written. In the Y sort buffer, polygon data are stored in the order along which the data are inputted. As LINK Y parameters in the Y sort buffer, the addresses of the next polygons belonging to the same line are stored.

Accordingly, when it is desired to know polygons that belong to a specified line, it is enough to trace back the links from a corresponding Y INDEX address to a polygon of which LINK Y is END.

An example shown in FIG. 7 will be described. When observing the Y index buffer at the uppermost fragment line of address is zero, its content is "EMPTY," showing that there is no polygon. The same is applied to the second line.

But the contents of the Y index buffer at its address 2 showing the third line are "ADR8" and "EMPTY." Hence, making access to ADR8 of the Y sort buffer leads to a LINK Y content of "ADR5." Hence, the next access is made to ADR5. After this, the similar access is made to ADR3 and ADR1 in sequence. Because the LINK Y content at ADR1 is "END," the link terminates. Like the above, the identical processing is executed toward all the fragment lines.

The operation for storing polygon data will be described.

Figure 8:
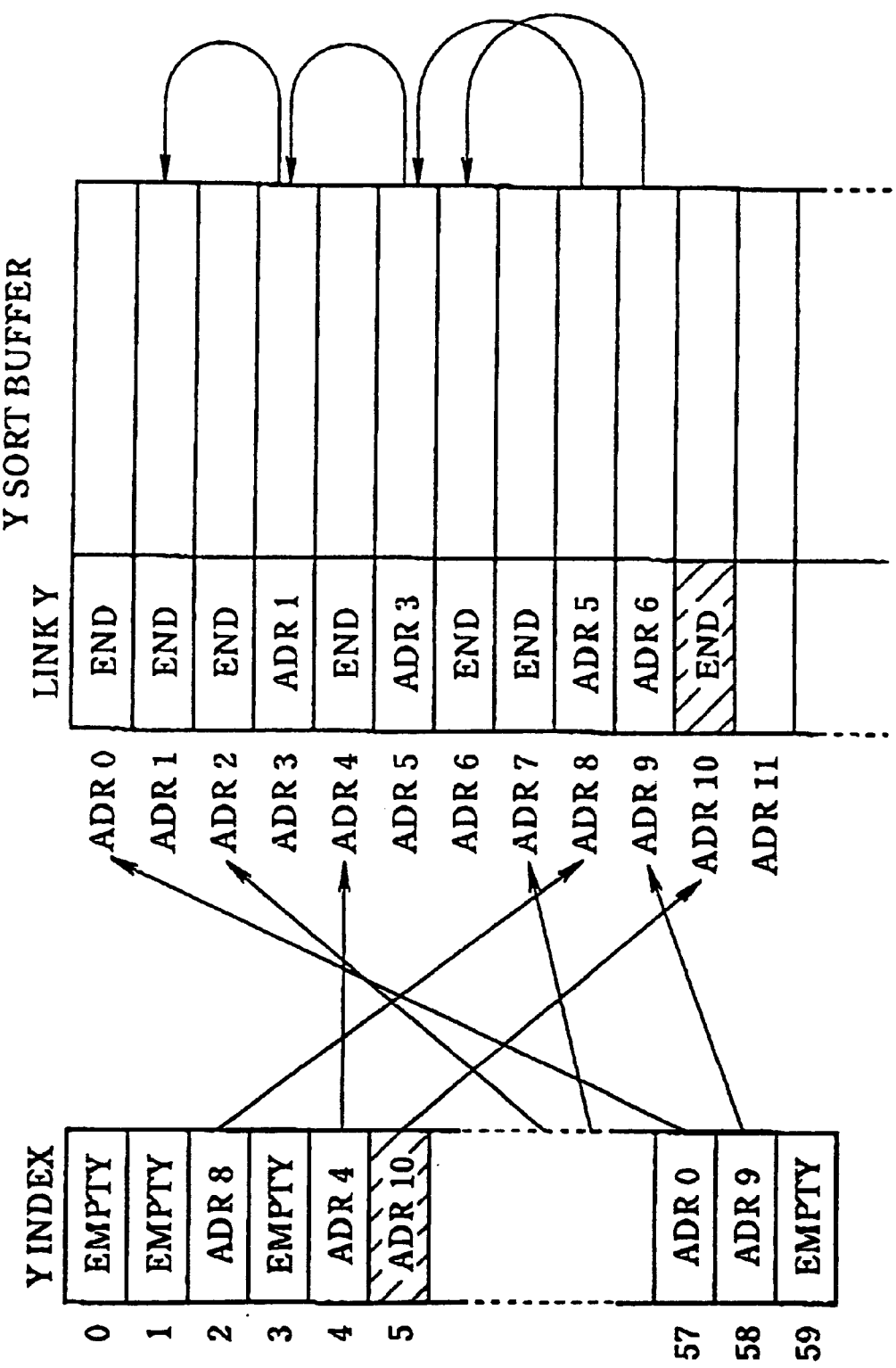
FIG. 8 is an illustration of processing as to a Y index buffer and a Y sort buffer in the first embodiment 1 of the present invention.

The assumption is made that in the state shown in FIG. 7, polygon data satisfying that Ymin is Y INDEX=5 are inputted. Because the fifth content of the Y index buffer is "EMPTY," the LINK Y of the polygon data becomes "END." This polygon data is stored at ADR10 of the Y sort buffer; on one hand, "ADR10," which is an address of the polygon data that have just been stored, is written at the fifth line of the Y index buffer. This new updated condition is shown in FIG. 8.

Figure 9:
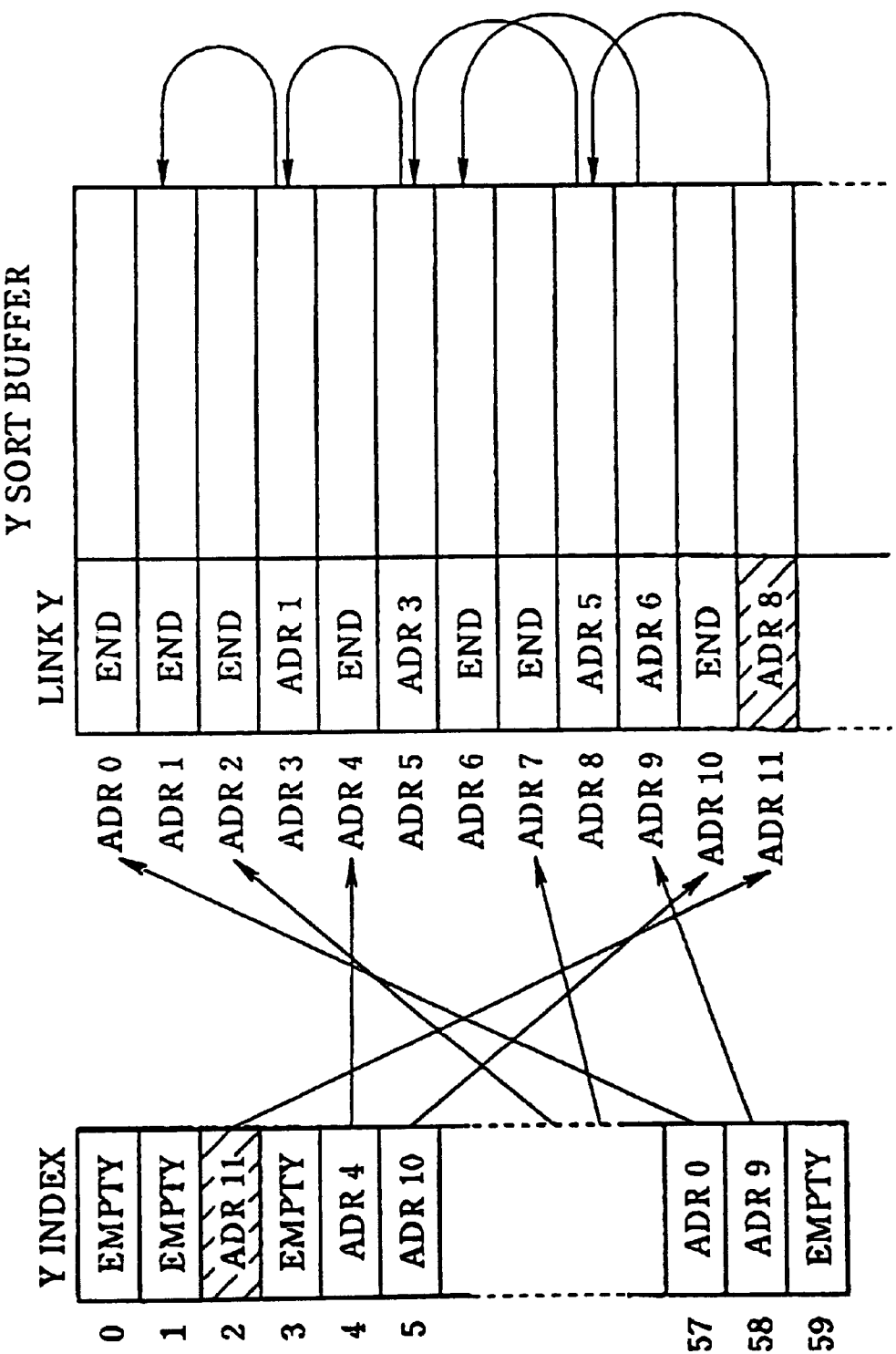
FIG. 9 is an illustration of processing as to a Y index buffer and a Y sort buffer in the first embodiment 1 of the present invention.

Next, the operation will be described with a situation that in the state shown in FIG. 8, polygon data satisfying that Ymin is Y INDEX=2 are inputted. Since an address of polygon data has already been stored at the second line of the Y index buffer ("ADR8" in FIG. 8), the polygon data is to be placed after a polygon to be written from now. Therefore, the LINK Y of the polygon data is set to "ADR8," the value of the original Y INDEX; on one hand, "ADR11," which is the address of the polygon data that have just been stored, is written at the second line of the Y index buffer. This new updated condition is shown in FIG. 9.

Figure 10:
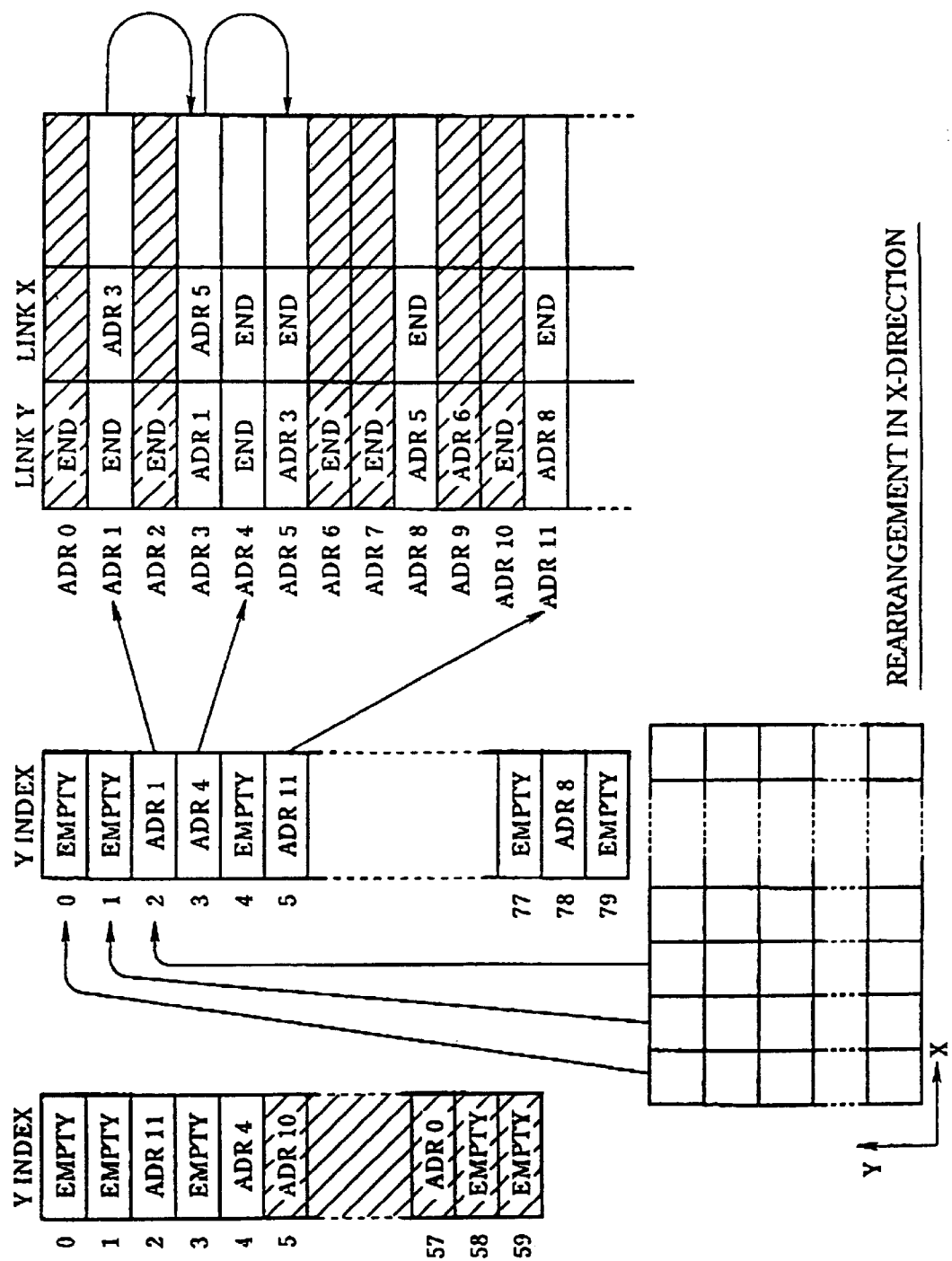
FIG. 10 is an illustration of processing as to a Y index buffer and a Y sort buffer in the first embodiment 1 of the present invention.

FIG. 10 is an illustration for explaining rearrangement in the X-direction. The rearrangement in the X-direction is processed similarly to that in the Y-direction, in which an X-min in its line is obtained, then the rearrangement is performed using the obtained value.

Figure 11:
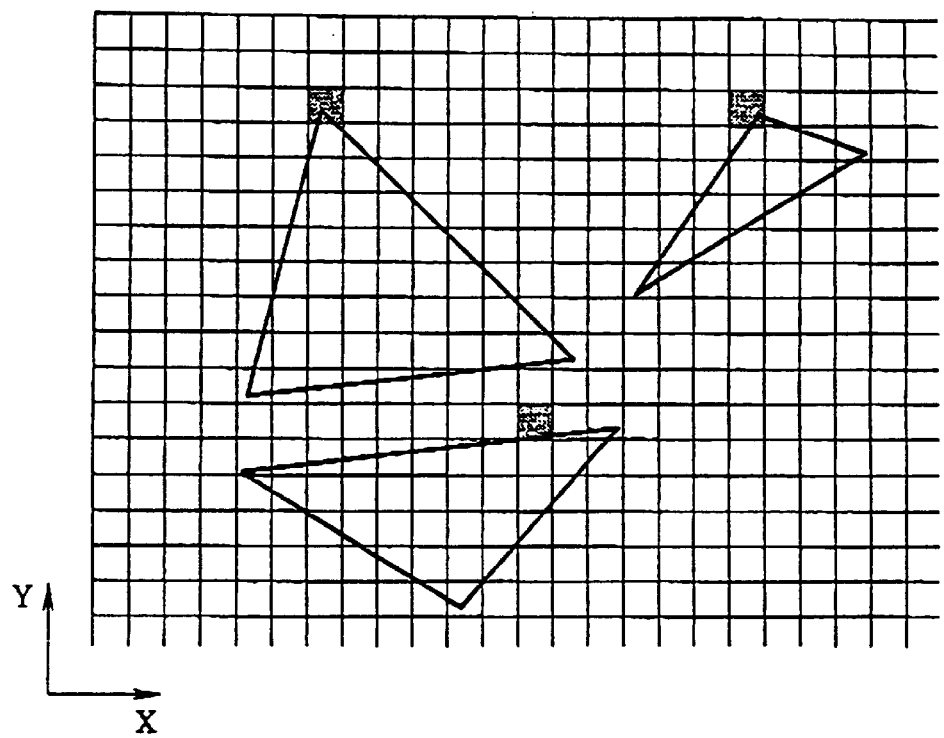
FIG. 11 exemplifies a fragment that first become valid for each polygon in the first embodiment 1 of the present invention.
Figure 12:
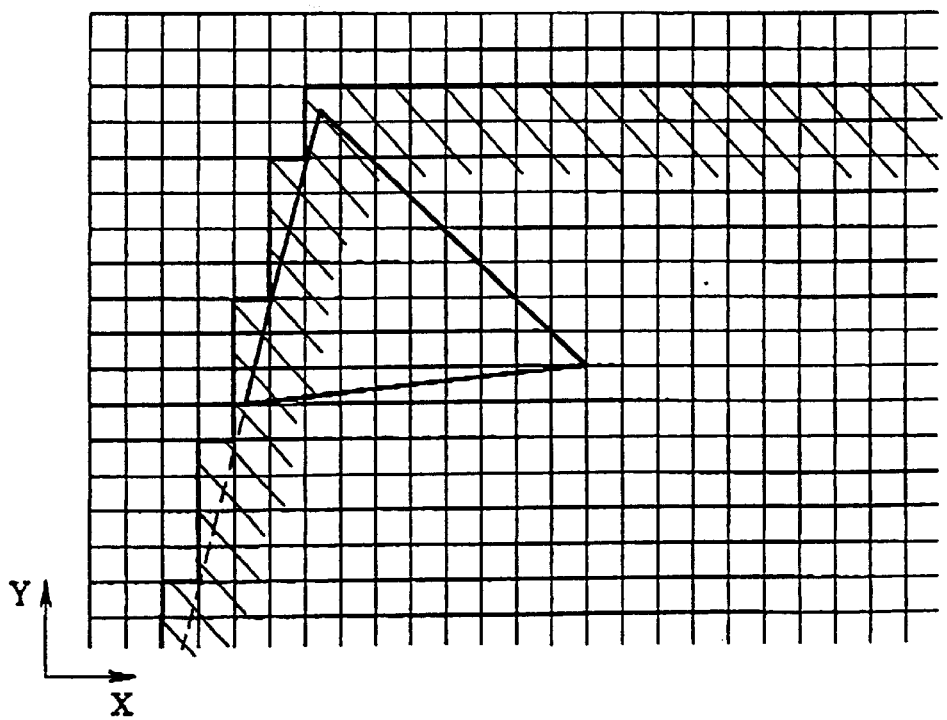
FIG. 12 is an illustration for link update processing in the first embodiment 1 of the present invention.
Figure 14:
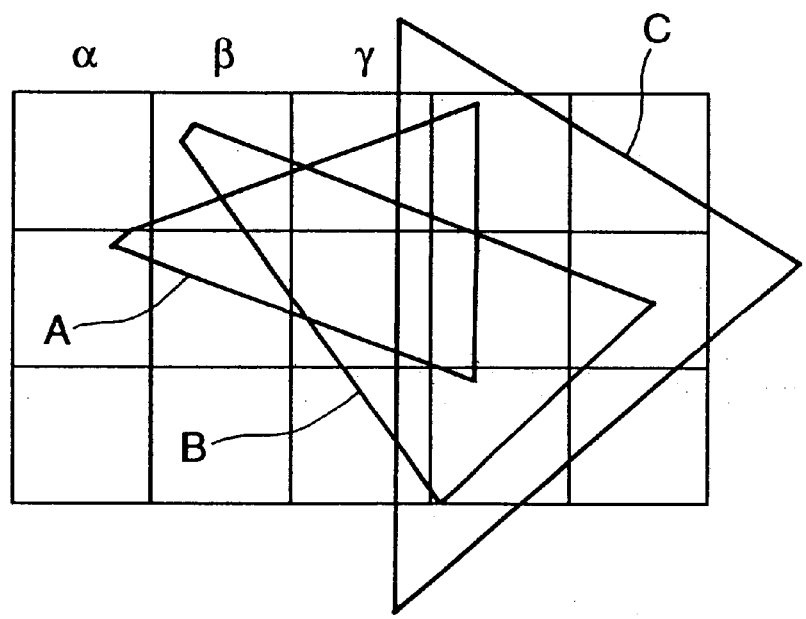
FIG. 14 is an illustration showing the relationship between fragments and polygons A, B and C, which explains the conventional processing.
Figure 15:
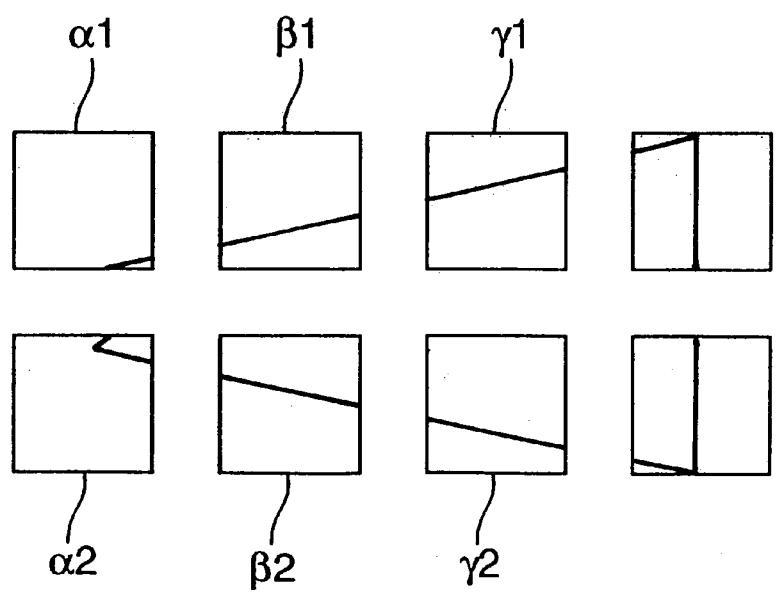
FIG. 15 is an illustration showing fragments that correspond to the polygon A, which explains the conventional processing.
Figure 16:
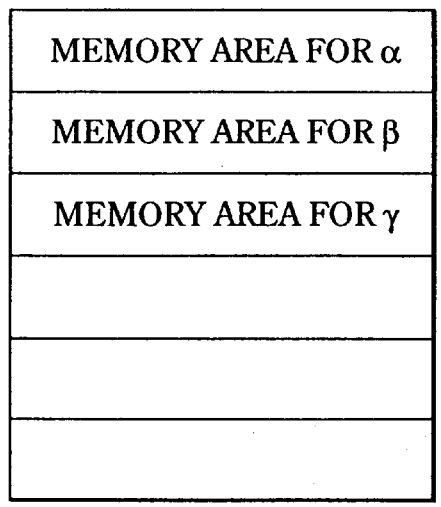
FIG. 16 is an illustration showing contents of a buffer memory, which is employed to explain the conventional processing.
Figure 17:
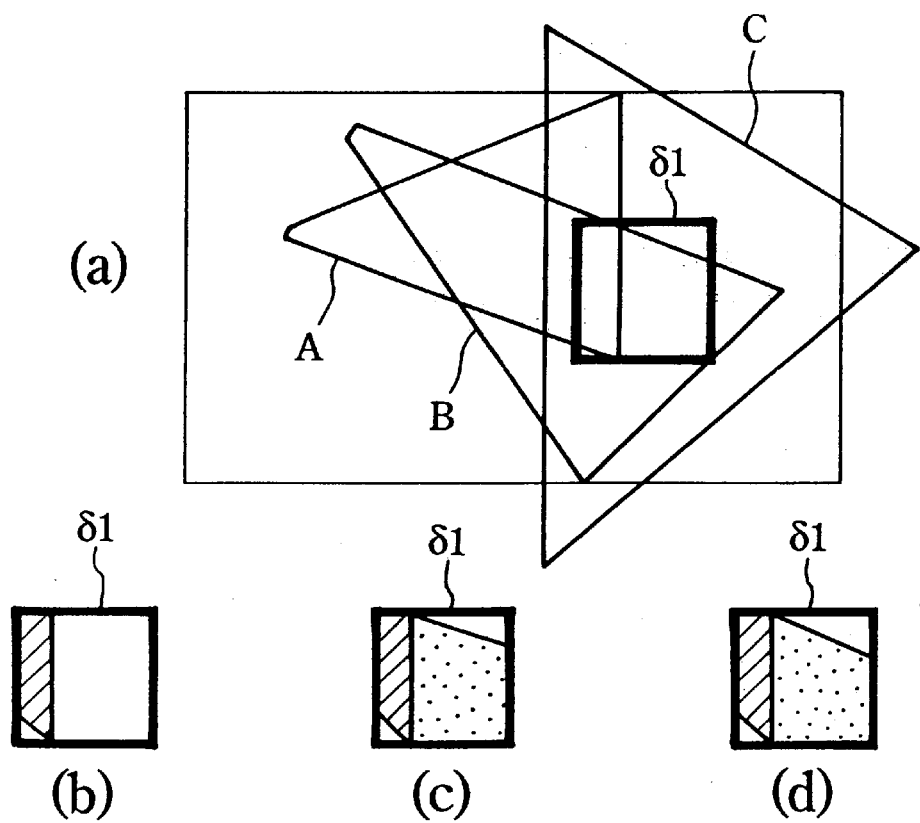
FIG. 17 is an illustration for painting processing according to the conventional processing.

As described above, by performing the rearrangements in both the X- and Y-directions, a fragment at which a polygon becomes valid for the first time (that is, the polygon that makes a fragment concerned valid for the first time) is found. For example, as shown in FIG. 11, a fragment of the least X-coordinate value is selected among the least Y-coordinate values in each polygon.

In addition, when referring to the rearranged results, all the lines from zero to a concerned line (row) are regarded as valid. Thus, if a certain polygon is concerned, a region validating the polygon is shown as in FIG. 12, resulting in that the valid region for the polygon includes unnecessary fragments. In this case, the link is therefore updated as below.

First, after the completion of the polygon processing, polygons that become invalid in the fragments subsequently processed are removed from the links. In an example shown in FIG. 13(a), fragments F1 to F7 are removed from the X LINK after the rendering. The fragment F7 is also removed from the Y LINK after the rendering. A polygon's valid region obtained by performing the link update is exemplified in FIG. 11(b).

The following are steps explaining the X-directional link with reference to FIG. 13.

(1): Among the intersections made between the polygon's edges and the horizontal boundaries of the fragments extending along the X-direction, an intersection having a larger X-coordinate value (P2) is examined.

(2): Comparison is made between the X-coordinate value at the point examined in the above step (1) and X-coordinate values of boundaries (boundaries 1 to 3) having larger X-coordinate values selected among the boundaries vertical to an X-coordinate of a fragment residing in a line currently concerned.

(3): In cases the comparison result is "small (boundaries 1 and 2)," the polygon undergoes the link processing, validating it toward the next fragment as well.

(4): Where the comparison result is "larger," the polygon is removed from the link after rendering, invalidating it from the processing for the next fragment (boundary 3).

The Y-directional link processing is also performed with respect to the Y-direction by the identical procedures.

As described above, in the embodiment 1 of the present invention, instead of dividing the polygons fragment by fragment, the polygons are rearranged in both the vertical direction and the horizontal direction to a scanning line, thus polygons included in each fragment being able to be retrieved. Since this retrieved information is used and the polygons are divided every fragment now concerned, it is possible to read and process polygons included in each fragment, without producing polygons newly. Thus, unlike the conventional technique, a huge amount of calculation necessary for dividing all the polygons every fragment to be objective can be eliminated and it is not necessary to install a storage with greater amounts of capacity that has been needed to store information about the polygons produced by the division. As a result, the processing time is shorted and it is possible to realize systems in which only a smaller capacity of storage is enough. In other words, cost-saving and high-performance systems can be achieved.

Such systems are also attributed to the fact that the processing of the polygons for the semitransparent nature is separated for opaque polygons, polygons with transparent pixels, and semitransparent polygons and the semitransparent polygons are processed at the last stage.

Industrial Applicability

According to the present invention, in the image processor where a screen is divided into regions at a predetermined size and processing is performed region by region, owing to the fact that pieces of information on image constituting elements are not merely rearranged in a vertical direction to a scanning line but also rearranged in a horizontal direction to the scanning line, then the image processing is performed based on the rearranged pieces of information on the image constituting elements, polygons included in each region can be retrieved. Thus, dividing the polygons every region currently concerned, using this retrieved information, makes it possible to read and process polygons included in each region, without producing polygons newly. As a result, a period of processing time is shortened and a memory capacity necessary for the storage can be lowered.

Additionally, according to the present invention, as to the image processing for each divided region, objects to be processed are sectioned into types of opaque polygons, polygons with transparent pixels, and semitransparent polygons, then processed in the order of the opaque polygons, the polygons with transparent pixels, and the semitransparent polygons, so that the semitransparent polygons can be processed even when texture data are given the polygons.

What we claim is:

1. An image preprocessor in which a screen is divided into regions of a predetermined size and processing is performed in every divided region, comprising:

first rearranging means for rearranging pieces of information on a plurality of image constituting elements constituting at least an image depicted on the screen, in a direction vertical to a scanning line;

second rearranging means for rearranging the pieces of information on the plurality of image constituting elements in a direction horizontal to the scanning direction; and an image processing unit not only taking in, from the rearranged pieces of information on the plurality of image constituting elements, pieces of information on the plurality of image constituting elements corresponding to regions at which the processing is performed, but also performing image processing; wherein the image processing unit, as to image processing for each divided region, not only sections objectives to be processed into opaque polygons, polygons with transparent pixels, and semitransparent polygons but also processes in the order of the opaque polygons, polygons with transparent pixels, and semitransparent polygons.

2. An image processing method by which a screen is divided into regions of a predetermined size and processing is performed in every divided region, the method comprising the steps of:

a first rearranging step of rearranging pieces of information on a plurality of image constituting elements constituting at least one image depicted on the screen, in a vertical direction to a scanning line;

a second rearranging step of rearranging the pieces of information on the image constituting elements in a direction horizontal to the scanning direction; and an image processing step of not only taking in, from the rearranged pieces of information on the image constituting elements, pieces of information on image constituting elements corresponding to regions at which the processing is performed, but also performing image processing; wherein at the image processing step, the image processing for each divided region is performed with objectives to be processed sectioned into opaque polygons, polygons with transparent pixels, and semitransparent polygons, and performed in the order of the opaque polygons, polygons with transparent pixels, and semitransparent polygons.

3. An image preprocessor in which a screen is divided into regions of a predetermined size and processing is performed in every divided region, comprising:

first rearranging means for rearranging pieces of information on a plurality of image constituting elements constituting at least one image depicted on the screen, in a direction vertical to a scanning line;

second rearranging means for rearranging the pieces of information on the image constituting elements in a direction horizontal to the scanning direction; and an image processing unit not only taking in, from the rearranged pieces of information on the image constituting elements, pieces of information on image constituting elements corresponding to regions at which the processing is performed, but also performing image processing; wherein the first rearranging means perform the rearrangement based on minimum or maximum values of the image constituting elements concerning the vertical direction;

the second rearranging means perform the rearrangement based on minimum or maximum values of the image constituting elements concerning the horizontal direction, in vertical coordinates of a region to be processed by the first rearranging means; and the image processing unit, as to image processing for each divided region, not only sections objectives to be processed into opaque polygons, polygons with transparent pixels, and semitransparent polygons but also processes in the order of the opaque polygons, polygons with transparent pixels, and semitransparent polygons.

4. An image preprocessor in which a screen is divided into regions of a predetermined size and processing is performed in every divided region, comprising:

first rearranging means for rearranging pieces of information on a plurality of image constituting elements constituting at least one image depicted on the screen, in a direction vertical to a scanning line;

second rearranging means for rearranging the pieces of information on the image constituting elements in a direction horizontal to the scanning direction; and an image processing unit not only taking in, from the rearranged pieces of information on the image constituting elements, pieces of information on image constituting elements corresponding to regions at which the processing is performed but also performing image processing; wherein the first rearranging means perform the rearrangement based on minimum or maximum values of the image constituting elements concerning the vertical direction;

the second rearranging means perform the rearrangement based on minimum or maximum values of the image constituting elements concerning the horizontal direction, in vertical coordinates of a region to be processed by the first rearranging means;

the first and second rearranging means rearrange the pieces of information on the image constituting elements by performing link processing which mutually links the pieces of information on the image constituting elements; and the image processing unit, as to image processing for each divided region, not only sections objectives to be processed into opaque polygons, polygons with transparent pixels, and semitransparent polygons but also processes in the order of the opaque polygons, polygons with transparent pixels, and semitransparent polygons.

5. An image preprocessor in which a screen is divided into regions of a predetermined size and processing is performed in every divided region, comprising:

first rearranging means for rearranging pieces of information on a plurality of image constituting elements constituting at least one image depicted on the screen, in a direction vertical to a scanning line;

second rearranging means for rearranging the pieces of information on the image constituting elements in a direction horizontal to the scanning direction, and an image processing unit not only taking in from the rearranged pieces of information on the image constituting elements, pieces of information on image constituting elements corresponding to regions at which the processing is performed but also performing image processing; wherein the first rearranging means perform the rearrangement based on minimum or maximum values of the image constituting elements concerning the vertical direction;

the second rearranging means perform the rearrangement based on minimum or maximum values of the image constituting elements concerning the horizontal direction, in vertical coordinates of a region to be processed by the first rearranging means;

the first and second rearranging means rearrange the pieces of information on the image constituting elements by performing link processing which mutually links the pieces of information on the image constituting elements;

the first and second rearranging means determines whether or not, after completion of the processing in the image processing unit, the pieces of information on the image constituting elements used by the image processing unit are included in a region to be image-processed at the next processing, and perform link update processing which removes from the link the pieces of information on the image constituting elements which are determined to not be included; and the image processing unit, as to image processing for each divided region, not only sections objectives to be processed into opaque polygons, polygons with transparent pixels, and semitransparent polygons but also processes in the order of the opaque polygons, polygons with transparent pixels, and semitransparent polygons.

6. An image processing method by which a screen is divided into regions of a predetermined size and processing is performed in every divided region, the method comprising the steps of:

a first rearranging step of rearranging pieces of information on a plurality of image constituting elements constituting at least one image depicted on the screen, in a vertical direction to a scanning line;

a second rearranging step of rearranging the pieces of information on the image constituting elements in a horizontal direction to the scanning line; and an image processing step of not only taking in, from the rearranged pieces of information on the image constituting elements, pieces of information on image constituting elements corresponding to regions at which the processing is performed, but also performing image processing; wherein at the first rearranging step, the rearrangement is performed on a minimum value or a maximum value of the image constituting elements with regard to the vertical direction;

at the second rearranging step, the rearrangement is performed on a minimum value or a maximum value of the image constituting elements with regard to the horizontal direction, among vertical coordinates of a region to be processed at the first rearranging step; and at the image processing step, the image processing for each divided region is performed with objectives to be processed sectioned into opaque polygons, polygons with transparent pixels, and semitransparent polygons, and performed in the order of the opaque polygons, polygons with transparent pixels, and semitransparent polygons.

7. An image processing method by which a screen is divided into regions of a predetermined size and processing is performed in every divided region, the method comprising the steps of:

a first rearranging step of rearranging pieces of information on a plurality of image constituting elements constituting at least one image depicted on the screen in a vertical direction to a scanning line;

a second rearranging step of rearranging the pieces of information on the image constituting elements in a horizontal direction to the scanning line; and an image processing step of not only taking in, from the rearranged pieces of information on the image constituting elements, pieces of information on image constitutng elements corresponding to regions at which the processing is performed, but also performing image processing; wherein at the first rearranging step, the rearrangement is performed on a minimum value or a maximum value of the image constituting elements with regard to the vertical direction;

at the second rearranging step, the rearrangement is performed on a minimum value or a maximum value of the image constituting elements with regard to the horizontal direction, among vertical coordinates of a region to be processed at the first rearranging step;

at the first and second rearranging steps, link processing is performed to mutually link the rearranged pieces of information on the image constituting elements; and at the image processing step, the image processing for each divided region is performed with objectives to be processed sectioned into opaque polygons, polygons with transparent pixels, and semitransparent polygons, and performed in the order of the opaque polygons, polygons with transparent pixels, and semitransparent polygons.

8. An image processing method by which a screen is divided into regions of a predetermined size and processing is performed in every divided region, the method comprising the steps of:

a first rearranging step of rearranging pieces of information on a plurality of image constituting elements constituting at least one image depicted on the screen in a vertical direction to a scanning line;

a second rearranging step of rearranging the pieces of information on the image constituting elements in a horizontal direction to the scanning line; and an image processing step of not only taking in, from the rearranged pieces of information on the image constituting elements, pieces of information on image constituting elements corresponding to regions at which the processing is performed, but also performing image processing; wherein at the first rearranging step, the rearrangement is performed on a minimum value or a maximum value of the image constituting elements with regard to the vertical direction;

at the second rearranging step, the rearrangement is performed on a minimum value or a maximum value of the image constituting elements with regard to the horizontal direction, among vertical coordinates of a region to be processed at the first rearranging step;

at the first and second rearranging steps, link processing is performed to mutually link the rearranged pieces of information on the image constituting elements;

at the first and second rearranging steps, link update processing is performed to invalidate an unnecessary region among the regions corresponding to the image constituting elements; and at the image processing step, the image processing for each divided region is performed with objectives to be processed sectioned into opaque polygons, polygons with transparent pixels, and semitransparent polygons, and performed in the order of the opaque polygons, polygons with transparent pixels, and semitransparent polygons.

9. An image processor in which a screen is divided at a predetermined size into regions which undergo processing region by region, comprising:

a memory buffer not merely memorizing pieces of information on a plurality of image constituting elements but also memorizing pieces of link information to perform linkage among associated ones of the image constituting elements for every piece of information on the image constituting elements;

an index buffer memorizing, in every divided region, a location of memorization of a piece of information on at least one of the image constituting elements among the pieces of information on the image constituting elements included in the divided regions; and an image processing unit not only reading from the buffer memory by the index buffer pieces of information on image constituting elements included in regions at which the processing is performed but also performing image processing; wherein the link information includes vertical link information mutually linking associated ones of the image constituting elements at positions in a vertical direction to a scanning line and horizontal link information mutually linking associated ones of the image constituting elements at positions in a horizontal direction to the scanning line;

the index buffer has a vertical-position index buffer memorizing, in every divided region, a location of memorization of a piece of information of at least one of the image constituting elements among the pieces of information the image constituting elements included in the divided regions at the positions in the vertical direction to the scanning line and a horizontal-position index buffer memorizing, in every divided region, a location of memorization of a piece of information of at least one of the image constituting elements among the pieces of information the image constituting elements included in the divided regions at the positions in the horizontal direction to the scanning line; and the image processing unit performs, after completion of the image processing, link update processing that determines whether or not the pieces of information on the image constituting elements used with the image processing are included in a region to be image-processed at the next processing, and removes from the link the pieces of information on the image constituting elements which are determined to not be included.

* * * * *